(12) United States Patent
Khurshudov et al.

(10) Patent No.: US 10,147,040 B2
(45) Date of Patent: Dec. 4, 2018

(54) DEVICE DATA QUALITY EVALUATOR

(71) Applicants:Andrei Khurshudov, Niwot, CO (US); Stephen Skory, Boulder, CO (US); Nicholas Roseveare, Longmont, CO (US)

(72) Inventors: Andrei Khurshudov, Niwot, CO (US); Stephen Skory, Boulder, CO (US); Nicholas Roseveare, Longmont, CO (US)

(73) Assignee: Alchemy IoT, Lafayette, CO (US)

( * ) Notice: Subject to any disclaimer, the term of this patent is extended or adjusted under 35 U.S.C. 154(b) by 40 days.

(21) Appl. No.: 15/480,693

(22) Filed: Apr. 6, 2017

(65) Prior Publication Data

US 2018/0211168 A1 Jul. 26, 2018

Related U.S. Application Data

(60) Provisional application No. 62/448,766, filed on Jan. 20, 2017.

(51) Int. Cl.
*G06F 19/00* (2018.01)
*G06N 5/02* (2006.01)

(52) U.S. Cl.
CPC .................................. *G06N 5/025* (2013.01)

(58) Field of Classification Search
CPC ...... A61B 5/0031; A61B 5/024; A61B 5/0452
USPC .......................................... 702/127, 182–185
See application file for complete search history.

(56) References Cited

U.S. PATENT DOCUMENTS

| | | |
|---|---|---|
| 3,771,059 A | 11/1973 | Butler et al. |
| 6,804,778 B1 | 10/2004 | Levi et al. |
| 7,272,776 B2 | 9/2007 | Kalthoff et al. |
| 7,281,001 B2 | 10/2007 | Caulfield et al. |
| 7,865,507 B2 | 1/2011 | Namait et al. |
| 8,046,385 B2 | 10/2011 | Wald et al. |
| 8,600,703 B1 | 12/2013 | Liphardt |
| 8,601,326 B1 | 12/2013 | Kirn |
| 8,751,436 B2 | 6/2014 | Lowry et al. |
| 8,805,730 B2 | 8/2014 | Yeri et al. |
| 8,983,787 B1 | 3/2015 | Liphardt |
| 9,092,468 B2 | 7/2015 | Nelke et al. |
| 9,152,662 B2 | 10/2015 | Bhide et al. |
| 9,348,851 B2 | 5/2016 | Kirn |
| 9,465,825 B2 | 10/2016 | Nelke et al. |
| 9,558,230 B2 | 1/2017 | Hollifield et al. |
| 9,594,797 B2 | 3/2017 | Hollifield et al. |
| 2013/0031044 A1 | 1/2013 | Miranda et al. |
| 2013/0055042 A1 | 2/2013 | Al Za'noun et al. |
| 2013/0073594 A1 | 3/2013 | Jugulum et al. |
| 2013/0091084 A1 | 4/2013 | Lee |
| 2013/0218846 A1 | 8/2013 | Laredo et al. |
| 2013/0314553 A1 | 11/2013 | Sun et al. |
| 2014/0059561 A1 | 2/2014 | Grasselt et al. |
| 2015/0019303 A1 | 1/2015 | Rao |
| 2015/0170616 A1 | 6/2015 | Corpet et al. |

(Continued)

*Primary Examiner* — Edward Raymond
(74) *Attorney, Agent, or Firm* — Thomas J. Lavan

(57) ABSTRACT

A method is provided for a device comprising at least one sensor providing sensor data. The method includes receiving, by a computer coupled to the device, the sensor data, providing the sensor data to at least one rule detector, evaluating, by the at least one rule detector, instances of sensor data triggered by the at least one rule detector, and determining, by the computer, that a sampling interval has ended, and in response calculating a data quality index based on the instances of triggered sensor data.

20 Claims, 11 Drawing Sheets

(56) References Cited

U.S. PATENT DOCUMENTS

| | | |
|---|---|---|
| 2015/0310132 A1 | 10/2015 | Derstadt |
| 2016/0063744 A1 | 3/2016 | Freeman |
| 2016/0098654 A1 | 4/2016 | Bhattacharjee et al. |
| 2016/0364434 A1 | 12/2016 | Spitz et al. |
| 2017/0017705 A1 | 1/2017 | Nelke et al. |
| 2017/0024427 A1 | 1/2017 | Daly et al. |
| 2017/0032002 A1 | 2/2017 | Grasselt et al. |
| 2017/0017913 A1 | 9/2017 | Bharti et al. |

Fig. 1A  IoT Data Quality Evaluation System
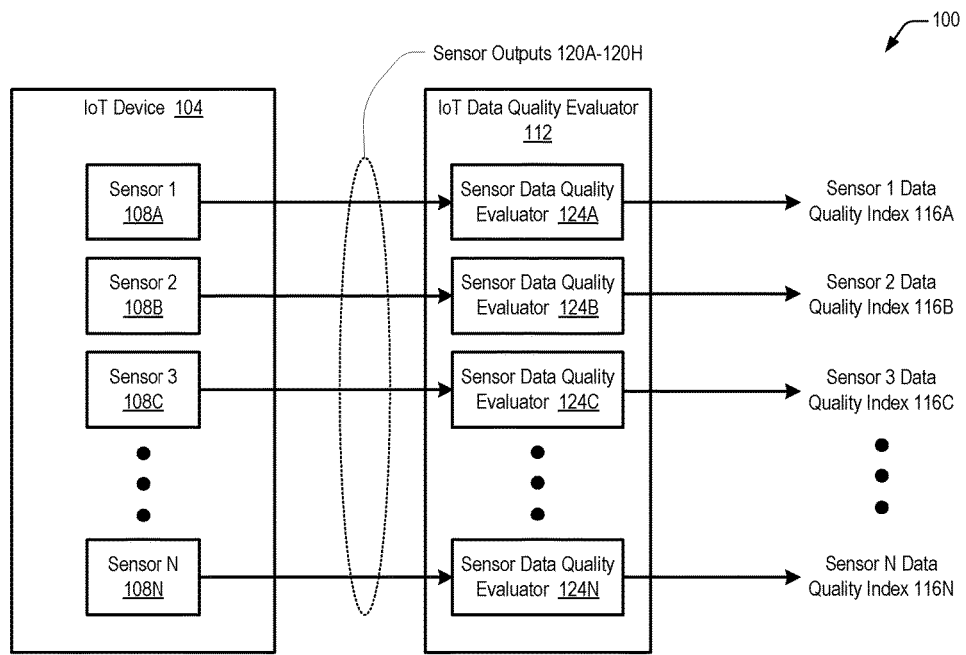
Fig. 1B  IoT Data Quality Evaluation System
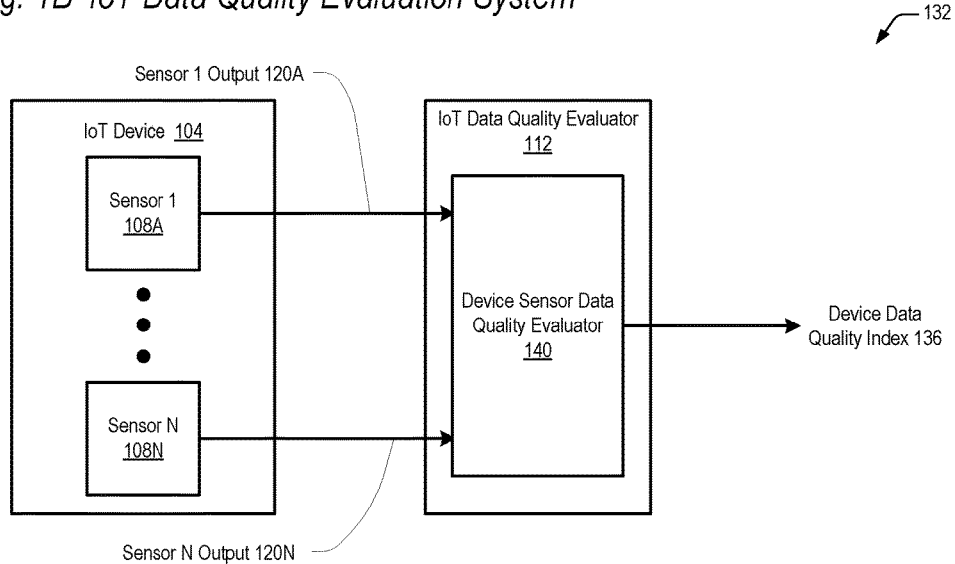

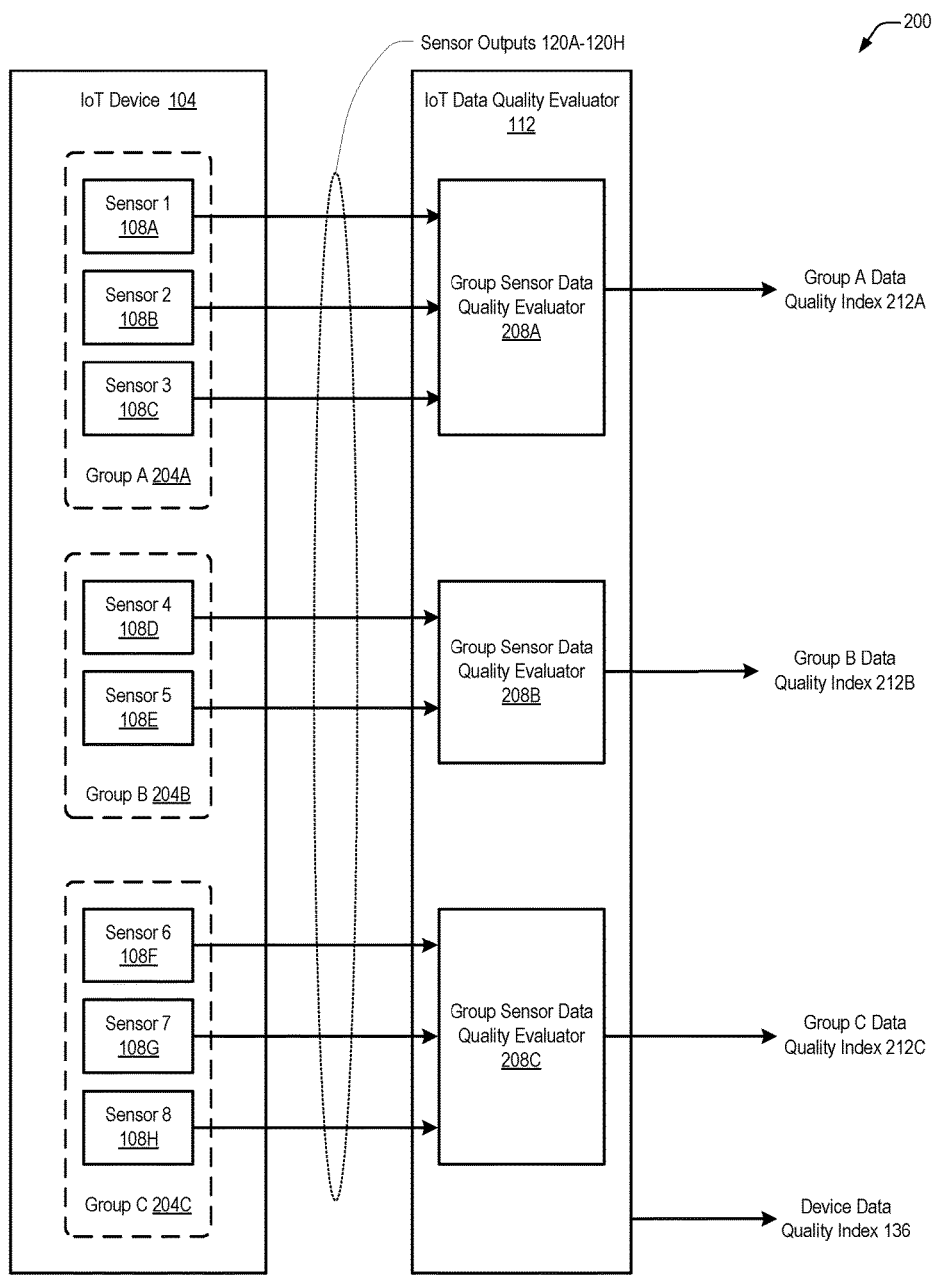
Fig. 2 IoT Data Quality Evaluation System

*Fig. 3A Sensor Data Windowing using Fixed Time Length*
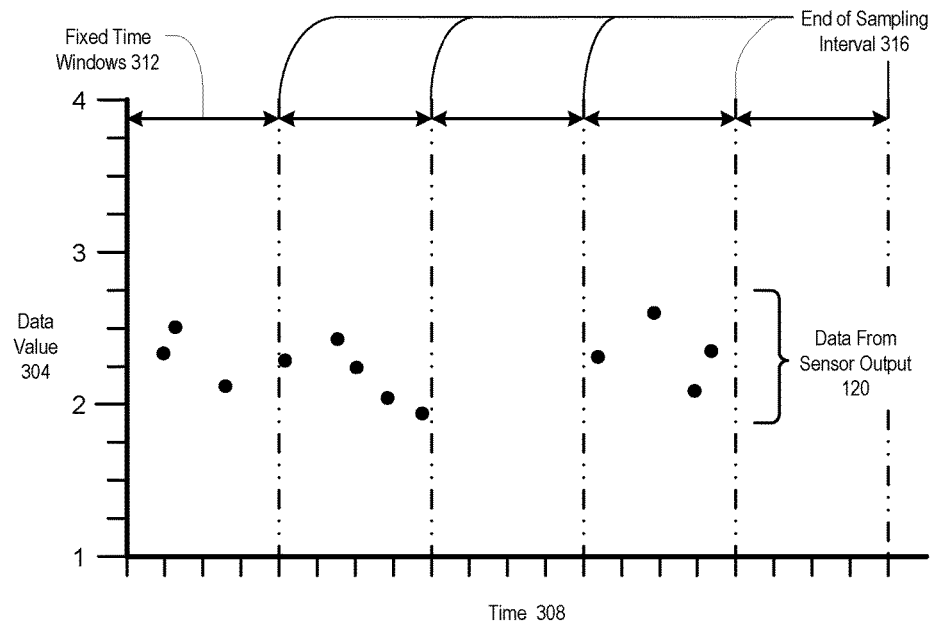
*Fig. 3B Sensor Data Windowing using Rolling Time Window*
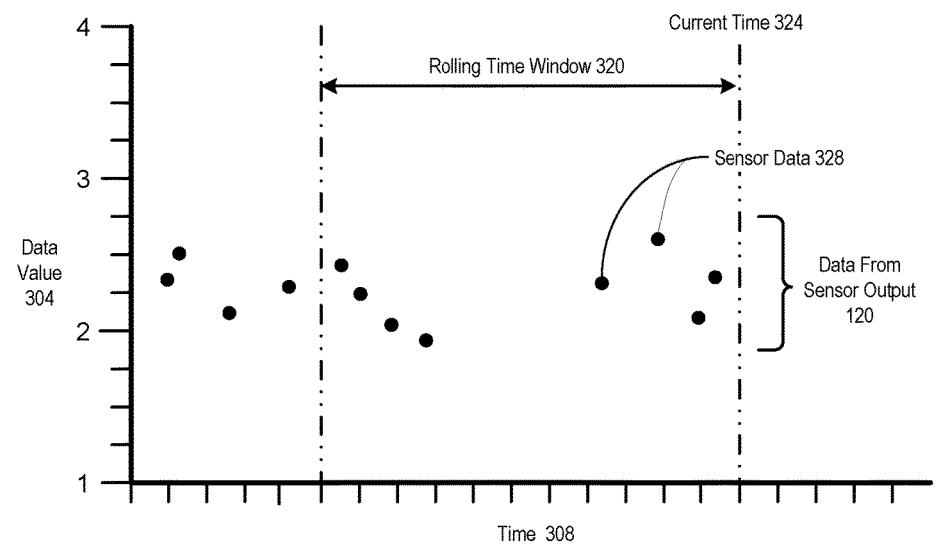

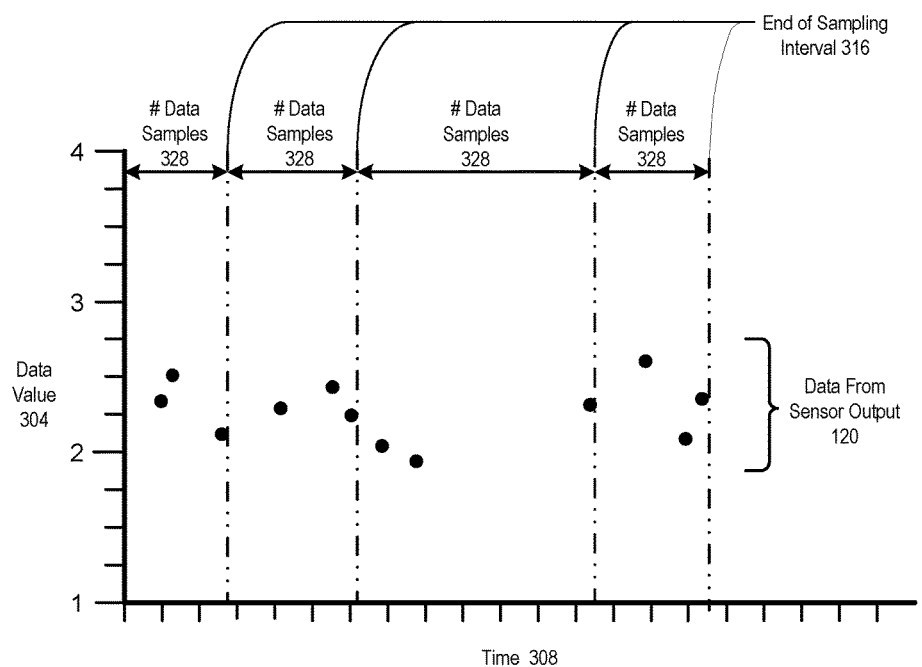
Fig. 3C Sensor Data Windowing using Fixed Number of Samples

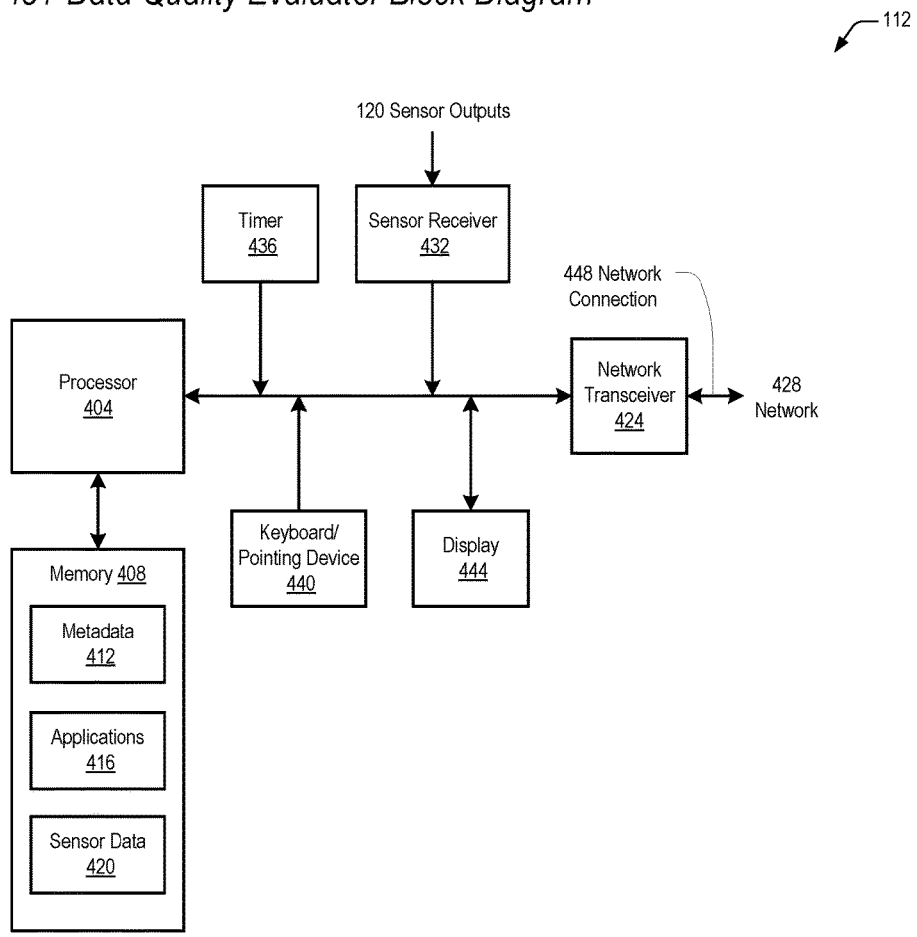
Fig. 4 IoT Data Quality Evaluator Block Diagram

Fig. 5 Sensor Data Quality Evaluator
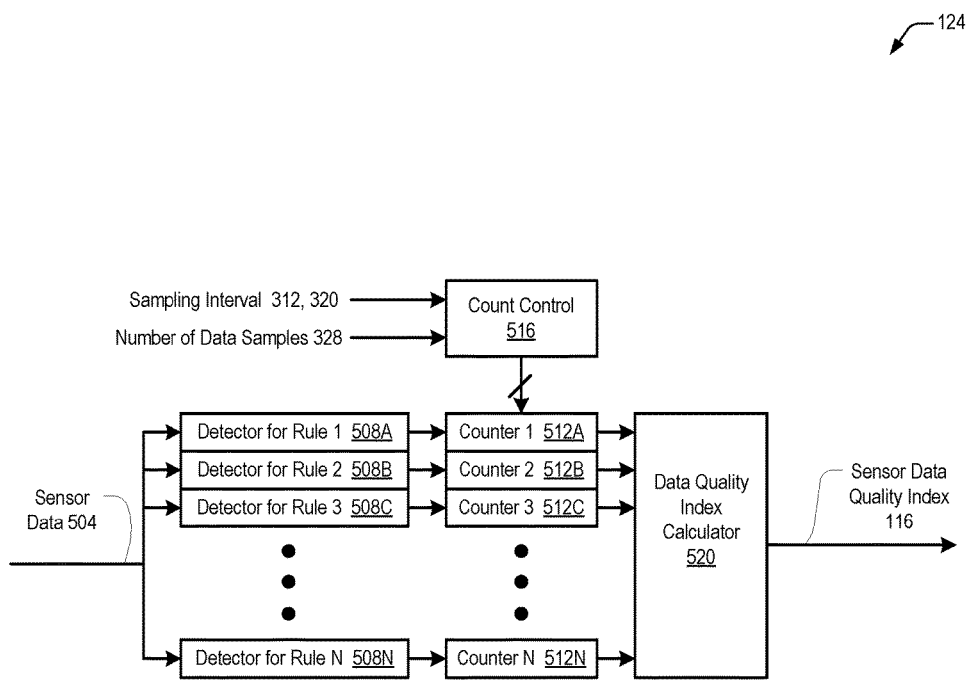

Fig. 6 Sensor Data Rules and Associations

412

| Sensor Data Rules 604 | Sensors 108 | | | | |
|---|---|---|---|---|---|
| | Sensor 1 108A | Sensor 2 108B | Sensor 3 108C | ••• | Sensor N 108N |
| Sensor Data Repeats 604A | ✓ | | ✓ | | |
| Sensor Data has 0.00 Value 604B | | ✓ | | | |
| Sensor Data is Shifted 604C | | ✓ | ✓ | | |
| Broken Sensor Data Structure 604D | | ✓ | | | ✓ |
| Wrong Sensor Data Format 604E | | ✓ | | | ✓ |
| Noisy Sensor Data 604F | ✓ | | | | ✓ |
| Logical Sensor Data Outliers 604G | | | | | ✓ |
| Split Sensor Data 604H | | | ✓ | | ✓ |
| Null Data 604I | | | | | |
| ⋮ | ⋮ | ⋮ | ⋮ | | ⋮ |
| Other Sensor Data Rules 604N | | | ✓ | ••• | |

*Fig. 7 Data Quality Index Calculation per Sensor and per Device for Time-Based Measurement*

$$X_j = \frac{D_j}{M}$$

M = 704 Number of Received Sensor Data Samples in the Sampling Interval $D_j$ = 708 Number of Received Sensor Data Samples in the Sampling Interval that violate Rule j (Triggered Sensor Data)

$X_j$ = 712 Normalized fraction of Rule Violations for Rule j during the Sampling Interval

116

716 Rule Violation Contributions $$\text{Data Quality Index (DQI)}_{Sensor} = (1 - X_1)*(1-X_2)*(1-X_3)*\ldots*(1-X_N)$$

N = Number of Rules in use for the Sensor

136

$$\text{Data Quality Index (DQI)}_{Device} = \text{Average of DQI}_{Sensor}$$

Fig. 8 Configuration Process
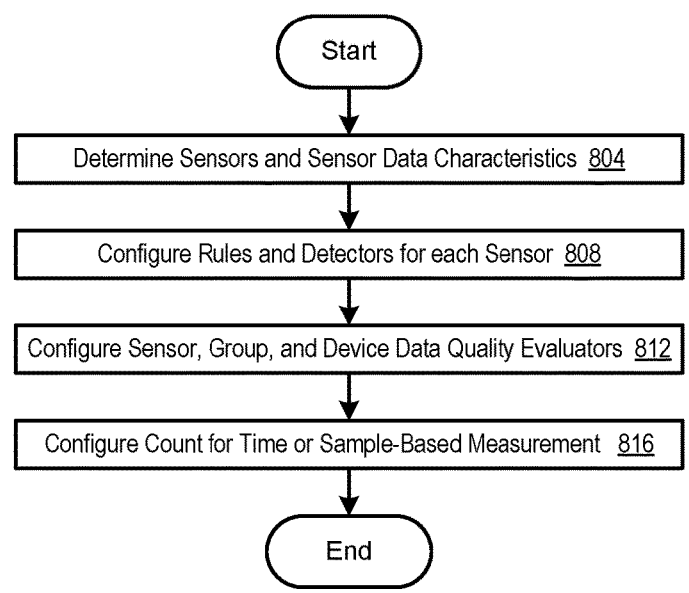

Fig. 9 Sensor Data Quality Evaluation Process
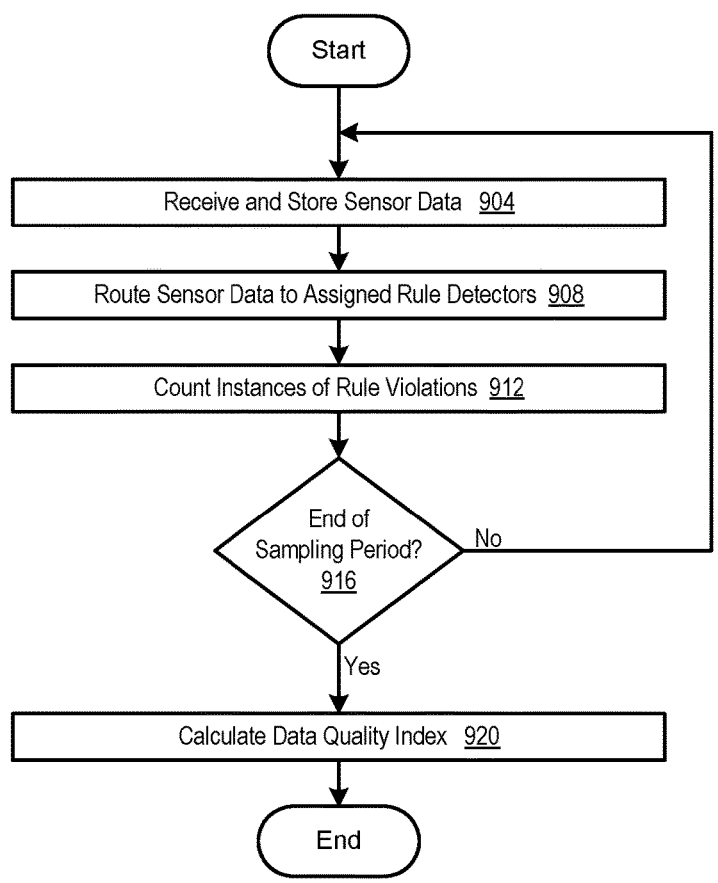

Fig. 10 Calculate Data Quality Index Process
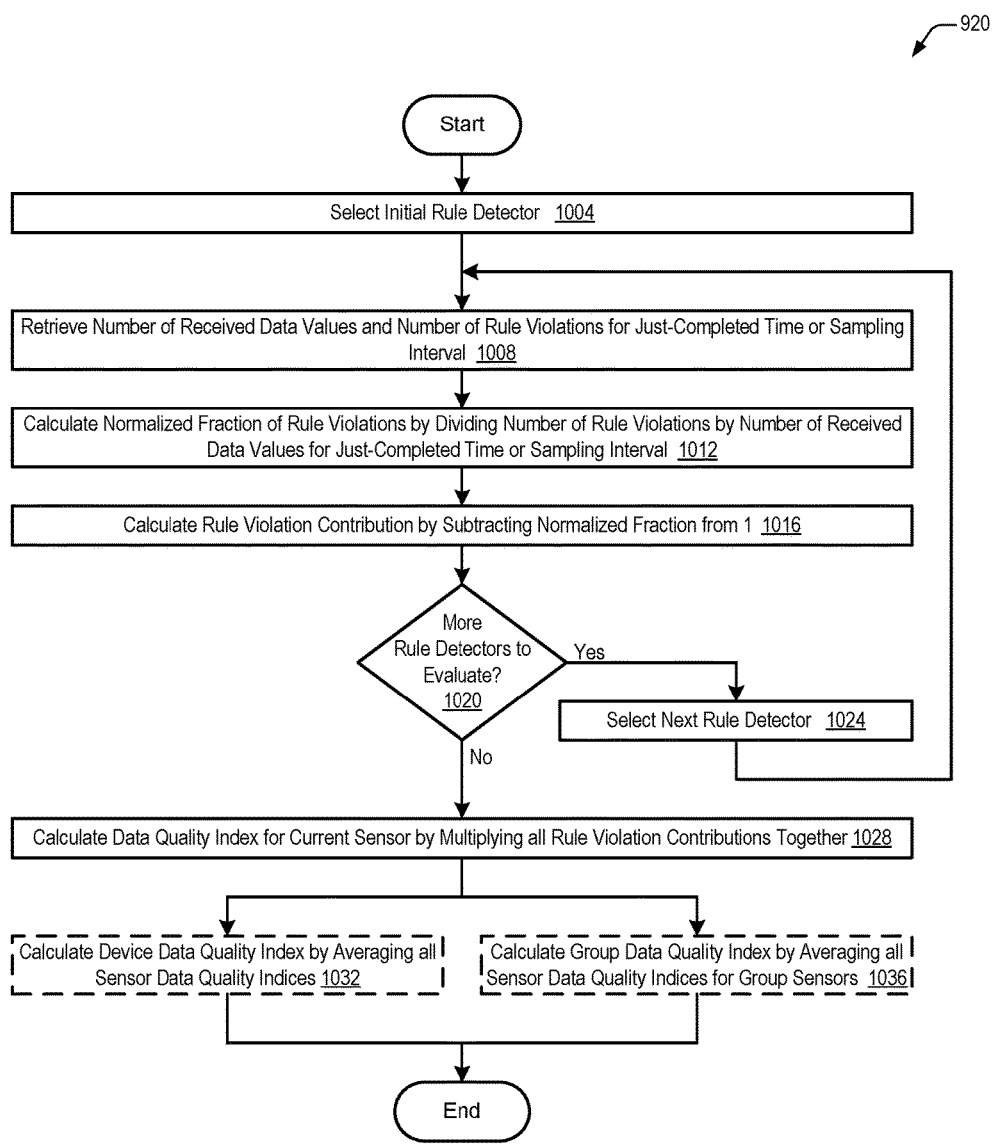

DEVICE DATA QUALITY EVALUATOR

CROSS REFERENCE TO RELATED APPLICATIONS

This application claims priority to earlier filed provisional application No. 62/448,766 filed Jan. 20, 2017 and entitled "DATA QUALITY INDEX PROCESS", the entire contents of which are hereby incorporated by reference.

FIELD

The present invention is directed to methods and systems for data quality evaluation. In particular, the present invention is directed to methods and systems for determining the quality of received sensor data from a device.

BACKGROUND

The Internet of Things (IoT) is a global network of connected physical and virtual objects that enables these objects to collect and exchange information and control each other. With the changing scope of applications of the internet shifting towards making the physical world smarter there is no doubt that a shift is occurring in the number of connected devices. Within 5 years it is estimated that 50 billion devices will be online. PCs, laptops and smart devices which dominate the internet at present will be dwarfed in number by these physical objects. The prerequisites of Internet of Things are many, although the main components can be categorized into three categories i.e. intelligence, sensing and communication.

Broadband Internet is become more widely available, the cost of connecting is decreasing, more devices are being created with Wi-Fi capabilities and sensors built into them, technology costs are going down, and smartphone penetration is skyrocketing. All of these things are creating a "perfect storm" for the IoT. The Internet of Things refers to the connectivity and inter-connectivity of devices, objects, people and places. Many of these new "things" which never used to have any intelligence, now communicate via a network using a variety of protocols (I-P, RFID, NFC, ZigBee, etc.). In some instances these "things" also communicate with applications, people and one another.

The growth of IoT devices will have important implications for people and businesses. Homes and consumers will acquire more devices that need support. Businesses and those providing managed services/maintenance and tech support will need to have more ways to support their customers. More devices added to networks adds more convenience to daily lives but can also cause many new problems. Also, connected devices have more intelligence than ordinary objects. This means they need support, maintenance and troubleshooting. At the same time, most consumers still have a "this should work" mentality. This means competing for consumer spending on maintenance and support—is difficult, but necessary.

More connected devices bring about greater concerns over security, data and privacy. The network will become central to a business or home's safety and security because more IoT devices will depend on it to do their job. Given the lack of IoT device standards at this point, most devices do not communicate with one another. They are designed to be self contained and separate and therefore each have their own procedure and system for troubleshooting and support.

SUMMARY

The present invention is directed to solving disadvantages of the prior art. In accordance with embodiments of the present invention, a method is provided for a device comprising at least one sensor providing sensor data. The method includes one or more of receiving, by a computer coupled to the device, the sensor data, providing the sensor data to at least one rule detector, evaluating, by the at least one rule detector, instances of sensor data triggered by the at least one rule detector, and determining, by the computer, that a sampling interval has ended, and in response calculating a data quality index based on the instances of triggered sensor data.

In accordance with other embodiments of the present invention, a non-transitory computer readable storage medium is provided. The non-transitory computer readable storage medium is configured to store instructions that when executed for a device comprising at least one sensor providing sensor data cause a processor to perform one or more of receiving, by a computer coupled to the device, the sensor data, providing the sensor data to at least one rule detector, evaluating, by the at least one rule detector, instances of sensor data triggered by the at least one rule detector, determining, by the computer, that a sampling interval has ended, and in response calculating a data quality index based on the instances of triggered sensor data.

In accordance with still other embodiments of the present invention, a system is provided. The system includes a device, which includes at least one sensor configured to provide sensor data, and a server coupled to the device. The server is configured to receive and store the sensor data, provide the sensor data to at least one rule detector, evaluate, by the at least one rule detector, instances of sensor data triggered by the at least one rule detector, determine that a sampling interval has ended, and in response calculate a data quality index based on the instances of triggered sensor data.

One advantage of the present invention is that it provides methods for determining received sensor data quality for a device. It is important to monitor data quality in order to understand sensor behavior and filter extraneous or unnecessary alarms while categorizing instances of received data rule violations.

Another advantage of the present invention is that it allows received data quality to be determined for an IoT device based on one or more groups of sensors. Sensors may be grouped or organized based on the type of data that sensors produce, and each group of sensors may produce a unique result. A data quality evaluation may be determined for a single sensor, a group of sensors, multiple groups of sensors, and an IoT device.

Yet another advantage of the present invention is that by reviewing sensor, group, and/or device data quality indices over time, it may be possible to discern impending device or sensor health issues and prioritize maintenance activities accordingly.

Additional features and advantages of embodiments of the present invention will become more readily apparent from the following description, particularly when taken together with the accompanying drawings. This overview is provided to introduce a selection of concepts in a simplified form that are further described below in the Detailed Description. It may be understood that this overview is not intended to identify key features or essential features of the claimed subject matter, nor is it intended to be used to limit the scope of the claimed subject matter.

BRIEF DESCRIPTION OF THE DRAWINGS

FIG. 1A is a block diagram illustrating components of an IoT Data Quality Evaluation System in accordance with a first embodiment of the present invention.

FIG. 1B is a block diagram illustrating components of an IoT Data Quality Evaluation System in accordance with a second embodiment of the present invention.

FIG. 2 is a block diagram illustrating components of an IoT Data Quality Evaluation System in accordance with a third embodiment of the present invention.

FIG. 3A is a graph illustrating sensor data windowing using fixed time length in accordance with embodiments of the present invention.

FIG. 3B is a graph illustrating sensor data windowing using a rolling time window in accordance with embodiments of the present invention.

FIG. 3C is a graph illustrating sensor data windowing using a fixed number of samples in accordance with embodiments of the present invention.

FIG. 4 is a block diagram illustrating components of an IoT Data Quality Evaluator in accordance with embodiments of the present invention.

FIG. 5 is a block diagram illustrating a Sensor Data Quality Evaluator in accordance with embodiments of the present invention.

FIG. 6 is a table illustrating Sensor Data Rules and Associations in accordance with embodiments of the present invention.

FIG. 7 is a diagram illustrating Data Quality Index Calculation per sensor and per-device for time-based measurement in accordance with embodiments of the present invention.

FIG. 8 is a flowchart illustrating a configuration process in accordance with embodiments of the present invention.

FIG. 9 is a flowchart illustrating a sensor data quality evaluation process in accordance with embodiments of the present invention.

FIG. 10 is a flowchart illustrating a calculate data quality index process in accordance with embodiments of the present invention.

DETAILED DESCRIPTION

Typical IoT devices transmit sensor data on a periodic basis and receive control commands and/or other information back. Statistics of different IoT machines and devices suggests that unexpected and abrupt failures are frequent and might represent as much as 50% of all the failures observed even for well-maintained devices with scheduled inspections, part replacement, and maintenance. Unexpected failures and unscheduled maintenance is expensive and, thus, reducing their number is of great importance to the device owners and operators.

IoT sensor data contains various information about different aspects of device operation, including device health. Sensors might measure device on/off status, location, velocity, temperature, and pressure of an engine and different components, etc. Some sensors could be directly measuring how close the device is to failure. Some other sensors are able to measure some critical degradation processes inside the device such as "oil degradation" or "remaining brake pad thickness" or qualitatively measure how well an IoT device is performing its intended job (i.e. performance).

In order to make accurate assessments of an IoT device, however, it is important to understand the nature of received sensor data. Ideally, the received sensor data includes valid status that accurately represents data produced by a sensor. However, in practice there may be many conditions that produce invalid data from sensors. A sensor itself or the IoT device may be malfunctioning, the interface (either software or hardware) may malfunction, or the communication network between the IoT device and the monitoring computer may be compromised in some fashion (RF interference, multipath, reflections, etc).

In order to ensure better quality sensor data, the monitoring computer needs to be able to recognize several categories of compromised sensor data, and maintain certain statistics for each category. Finally, the monitoring computer creates a data quality index for each sensor, group of sensors, and/or the device itself, and provides the data quality index or indices to either a human user or an evaluation computer program to make decisions as to whether to accept or reject sensor data and identify possible failure points in the sensor data reporting chain.

Referring now to FIG. 1A, a block diagram illustrating components of an IoT Data Quality Evaluation System 100 in accordance with a first embodiment of the present invention is shown. IoT data quality evaluation system 100 includes an IoT device 104 and an IoT data quality evaluator 112.

IoT device 104 is an Internet of Things device with at least one network connection. IoT is the inter-networking of physical devices, vehicles (also referred to as "connected devices" and "smart devices"), buildings, and other items—embedded with electronics, software, sensors, actuators, and network connectivity that enable these objects to collect and exchange data. In 2013 the Global Standards Initiative on Internet of Things (IoT-GSI) defined the IoT as "the infrastructure of the information society". The IoT allows objects to be sensed and/or controlled remotely across existing network infrastructure, creating opportunities for more direct integration of the physical world into computer-based systems, and resulting in improved efficiency, accuracy and economic benefit in addition to reduced human intervention. When IoT is augmented with sensors and actuators, the technology becomes an instance of a more general class of cyber-physical systems, which also encompasses technologies such as smart grids, smart homes, intelligent transportation and smart cities. Each "thing" is uniquely identifiable through its embedded computing system but is able to interoperate within the existing Internet infrastructure. Experts estimate that the IoT will consist of almost 50 billion objects by 2020.

Typically, IoT is expected to offer advanced connectivity of devices, systems, and services that goes beyond machine-to-machine (M2M) communications and covers a variety of protocols, domains, and applications. The interconnection of these embedded devices (including smart objects), is expected to usher in automation in nearly all fields, while also enabling advanced applications like a smart grid, and expanding to areas such as smart cities. "Things," in the IoT sense, can refer to a wide variety of devices such as heart monitoring implants, biochip transponders on farm animals, electric clams in coastal waters, automobiles with built-in sensors, DNA analysis devices for environmental/food/pathogen monitoring or field operation devices that assist firefighters in search and rescue operations. These devices collect useful data with the help of various existing technologies and then autonomously flow the data between other devices. Current market examples include home automation (also known as smart home devices) such as the control and automation of lighting, heating (like smart thermostat), ventilation, air conditioning (HVAC) systems, and appliances such as washer/dryers, robotic vacuums, air purifiers, ovens or refrigerators/freezers that use Wi-Fi for remote monitoring.

In addition to whatever core functionality and IoT device 104 has, in most embodiments IoT devices 104 includes one or more sensors 108. Sensors 108 monitor specific functions of IoT device 104 in order to allow an outside device (IoT data quality evaluator 112) to make an independent judgment of a level of operability or health of the IoT device 104. IoT devices 104 may have many different sensors 108, each measuring a different aspect of IoT device 104 reliability or performance. FIG. 1A illustrates an IoT device 104 with N sensors, identified as sensor 1 108A through sensor N 108N. The present application assumes that IoT device 104 includes at least one sensor 108. Each sensor 108 has a corresponding sensor output 120.

Sensor outputs 120 may be monitored in several different ways. Sensor outputs 120 may produce data on a random basis, semi-regularly, or periodically. Random sensor data may be produced at any time. Semi-regular sensor data may be produced with some regularity (for example once per day), but may not be predictably produced (for example at a random time each day). Periodic sensor data is produced with constant time differences between each data item. Sensor data may be produced as a batch of data from a sensor 108—so that a single sensor output 120 event may contain multiple data points. In lieu of an IoT device 104 producing sensor data on a random, semi-regular, or periodic basis, an IoT data quality evaluator 112 may instead poll one or more sensor outputs 120 randomly or periodically. An IoT device 104 may also stream data to the IoT data quality evaluator 112. In some embodiments, an IoT device 104 may be configured to produce sensor data at a frequency, batch, or other timed parameter to the IoT data quality evaluator 112.

Sensor outputs 120 are connected to an IoT data quality evaluator 112, which is generally a computer or other device able to interface with sensor outputs 120, store sensor output data, evaluate sensor output data, and determine and output sensor data quality indices 116 for each sensor output 120. IoT data quality evaluator 112 includes one or more sensor data quality evaluators 124, allocated on the basis of one sensor data quality evaluator 124 per each sensor 108. Each sensor data quality evaluator 124 produces an independent sensor data quality index 116. Sensor data quality evaluators 124 may be either hardware or software, or a combination of both. Additionally, sensor data quality evaluators 124 may be different application threads of an overall sensor 108 or device 104 data quality evaluation program.

Each sensor data quality index 116 may be provided to another computer, a user, or transmitted to one or more IoT devices 104 for various purposes. For the embodiment illustrated in FIG. 1A, each sensor 108, sensor output 120, and sensor data quality index 116 is evaluated independently of all other sensors 108 sensor outputs 120, and sensor data quality indices 116. It should be noted that while IoT device 104 may be an "Internet of Things" device, any other device including one or more sensor outputs 120 is considered to be an IoT device 104 of the present application. Therefore, the present application is not limited to IoT devices 104 only.

Referring now to FIG. 1B, a block diagram illustrating components of an IoT Data Quality Evaluation System 132 in accordance with a second embodiment of the present invention is shown. IoT data quality evaluation system 132 includes an IoT device 104 and an IoT data quality evaluator 112.

IoT data quality evaluation system 132 is similar to IoT data quality evaluation system 100, but also includes a device sensor data quality evaluator 140. The device sensor data quality evaluator 132 includes sensor data quality evaluators 124 for each sensor 108, which the device sensor data quality evaluator 140 utilizes in order to produce a device data quality index 136. In some embodiments, the IoT data quality evaluator 140 outputs sensor data quality indices 116 for each sensor 108 in addition to the device data quality index 136.

Referring now to FIG. 2, a block diagram illustrating components of an IoT Data Quality Evaluation System 200 in accordance with a third embodiment of the present invention is shown. IoT device 104 includes multiple sensors 108, identified as sensor 1 108A through sensor 8 108H.

In addition to multiple sensors 108, sensors are grouped into two or more Groups 204. Groups 204 may be helpful to define where different forms of sensor functionality are present. For example, one group 204 of sensors 108 may be related to engine performance (temperatures, pressures, flow rates, and so on). Another group 204 of sensors 108 may be related to atmospheric conditions (temperature, wind strength and direction, overcast conditions, etc.). Yet another group 204 of sensors 108 may be related to work output of an IoT device 104 (amount of material handled, rejected, or identified for future attention).

In the illustrated embodiment, IoT device 104 has three Groups 204, identified as group A 204A, group B 204B, and group C 204C. Group A 204A includes sensor 1 108A, sensor 2 108B, and sensor 3 108C. Group B 204B includes sensor 4 108D and sensor 5 108E. Group C 204C includes sensor 6 108F, sensor 7 108G, and sensor 8 108H. Each group 204 includes at least one sensor 108.

Unlike the embodiments shown in FIGS. 1A and 1B, the embodiment illustrated in FIG. 2 produces one independent group data quality index 212 for each group 204. IoT data quality evaluation system 200 is similar to IoT data quality evaluation system 100, but also includes a group sensor data quality evaluator 208 for each group 204. Each group sensor data quality evaluator 208 receives sensor outputs 120 from sensors 108 assigned to the corresponding group 204, and produces a unique group data quality index 212. Group sensor data quality evaluator 208A receives sensor outputs 120 from sensor 1 108A, sensor 2 108B, and sensor 3 108C, and produces Group A data quality index 212A. Group sensor data quality evaluator 208B receives sensor outputs 120 from sensor 4 108D and sensor 5 108E, and produces Group B data quality index 212B. Group sensor data quality evaluator 208C receives sensor outputs 120 from sensor 6 108F, sensor 7 108G, and sensor 8 108H, and produces Group C data quality index 212C.

The group sensor data quality evaluators 208 includes sensor data quality evaluators 124 for each sensor 108, which the group sensor data quality evaluators 208 utilize in order to produce a group data quality index 212. In some embodiments, the group data quality evaluators 208 outputs sensor data quality indices 116 for each sensor 108 in addition to the group data quality index 212. In some embodiments, the IoT data quality evaluator 112 may also produce a device data quality index 136, as described with reference to FIG. 1B.

Although the embodiment illustrated in FIG. 2 shows each sensor 108 in a specific group 204, it should be understood that a given sensor 108 may be in more than one group 204, and some sensors 108 may be in one or more groups 204 while other sensors 108 may not be in a group 204. Processes described herein include processes to generate group 212 or device 136 data quality indices from a plurality of sensors 108A-N and sensor outputs 120A-N.

Referring now to FIG. 3A, a graph illustrating sensor data windowing using fixed time length 312 in accordance with embodiments of the present invention is shown. The graph illustrates data values 304 corresponding to a sensor output 120 received over time 308. The present invention examines data from sensor outputs 120 in order to make an objective determination of sensor data quality. In one embodiment, data from sensors 108 is evaluated at an end of each sampling interval 316 corresponding to a fixed time window 312. A fixed time window 312 is a predetermined value of time that data is evaluated over. Each sensor 108 may have a different predetermined value for the fixed time windows 312, or all sensors 108 may have the same predetermined value for the fixed time windows 312.

Referring now to FIG. 3B, a graph illustrating sensor data windowing using a rolling time window 320 in accordance with embodiments of the present invention is shown. A rolling time window 320 is a window of predetermined value back in time relative to the current time 324. Thus, for a given sensor 108, the rolling time window 320 will be of the same length but will apply to a different actual time 308 for each sensor data sample 328. Each sensor 108 may have a different predetermined value for the rolling time window 320, or all sensors 108 may have the same predetermined value for the rolling time window 320. Either the fixed time windows 312 or a rolling time window 320 may be used to evaluate sensor data 328. In some embodiments, all sensor data quality evaluators 124 use fixed time windows 312. In other embodiments, all sensor data quality evaluators 124 use rolling time windows 320. In yet other embodiments, some sensor data quality evaluators 124 use fixed time windows 312 while other sensor data quality evaluators 124 use rolling time windows 320.

Referring now to FIG. 3C, a graph illustrating sensor data windowing using a fixed number of samples in accordance with embodiments of the present invention is shown. Instead of a time-based approach to evaluating sensor data 328, a samples-based approach may be used. Here, a predetermined number of data samples 328 are initially defined, and an end of a sampling interval 316 is defined when a last data sample 328 of the predetermined number of data samples has been received. Thus, some sampling intervals may be very short if the predetermined number of data samples 328 are received in a short period of time 308 while other sampling intervals may be very long if the predetermined number of data samples 328 are received in a long period of time 308. In the embodiment of FIG. 3C, even though the actual time may vary for each sampling interval 316, it is necessary to use either a fixed time window 312 or a rolling time window 320 to evaluate the sensor data.

Referring now to FIG. 4, a block diagram illustrating components of an IoT Data Quality Evaluator 112 in accordance with embodiments of the present invention is shown. IoT data quality evaluator 112 is generally a computer of some sort, including a server, desktop computer, mobile computer, or wearable computer.

IoT data quality evaluator 112 includes one or more processors 404, which execute computer-readable instructions of the present invention. Processors 404 may include x86 processors, RISC processors, embedded processors, other types of processors, FPGAs, programmable logic, or pure hardware devices.

Processor 404 interfaces with memory 408, which stores metadata 412, applications 416, and/or sensor data 420. Metadata 412 includes data structures and parameters used in the processes of the present invention. Applications 416 includes computer-readable instructions including instructions for processes of the present invention. Sensor data 420 is data from sensor outputs 120, and may include a received time stamp 308 in addition to a data value 304. Memory 408 may include any combination of volatile and non-volatile memory.

In some embodiments, IoT data quality evaluator 112 interfaces with one or more external databases (not shown) that may provide increased storage for any of metadata 412, applications 416, or sensor data 420. In some embodiments, IoT data quality evaluator 112 may utilize stateless processing or in-memory processing and not store older sensor data than the most recently received sensor data. In that case, the IoT data quality evaluator 112 will need to maintain running statistics as new data is received as well as other "summary" statistics such as the number of sensor data samples received.

IoT data quality evaluator 112 may optionally include one or more timers 436, a keyboard or pointing device 440, and a display 444. Timers 436 may alternatively be present within processors 404 or implemented in software within applications 416. A keyboard or pointing device 440 and display 444 are required if the IoT data quality evaluator 112 directly interfaces with a user. Otherwise, they may not be required.

IoT data quality evaluator 112 receives sensor outputs 120 through a sensor receiver 432. The sensor receiver 432 may be conditioned to sample sensor outputs 120 at regular intervals or operate in a batch or an event-driven basis. Once sensor outputs 120 have been received, they are stored as sensor data 420 in the memory 408 or in some other database. In some embodiments, sensor data from sensor outputs 120 is received through network transceiver 424 instead.

Finally, the IoT data quality evaluator 112 may include one or more network transceivers 424, which connects to a network 428 through network connections 448. Network transceiver 424 is generally the means through which IoT data quality evaluator 112 reports each sensor data quality index 116, group data quality index 212, or device data quality index 136 to another computer or user. However, in some embodiments one or more sensor data quality index 116, group data quality index 212, or device data quality index 136 are displayed 444 in lieu of transmitting to another computer on the network 428.

Referring now to FIG. 5, a block diagram illustrating a Sensor Data Quality Evaluator 124 in accordance with embodiments of the present invention is shown. IoT data quality evaluator 112 monitors sensor data 504 from each monitored sensor 108 of an IoT device 104. Each monitored sensor 108 produces values 304 over time 308. The range of values 304 is determined by characteristics of the corresponding sensor 108, and the range of values 304 for any sensor 108 may be any numerical value. Sensor data 504 may be received regularly or randomly.

Sensor data quality evaluator 124 is based on checking the sensor data 504 versus one or more rules. The rules are explained in more detail with respect to FIG. 6. Each rule has a corresponding detector 508, and at least one rule/detector 508 must be present in each sensor data quality evaluator 124. There is no upper limit on numbers of rules/detectors 508 that may be in-use for a specific sensor data quality evaluator 124. However, every sensor data quality evaluator 124 may have a different combination of rules/detectors 508. Rules/detectors 508 are configured before use for each sensor data quality evaluator 124.

Associated with each rule/detector 508 is a corresponding counter 512. In the preferred embodiment, each of the counters 512 is initialized with a zero value at the beginning of a new window of samples and the counters up-count with each detected rules violation by a detector 508. Other embodiments may mechanize the counters differently, as required. The counters 512 are controlled by a count controller 516, which determines when the counters 512 begin and end counting. In one embodiment, counters 512 begin counting after initial configuration or at the conclusion of a sampling interval 316, and end counting at the end of a fixed time window 312. In another embodiment using a rolling time window 320 instead of a fixed time window 312, the count 512 is determined for each time increment and a new sensor data quality index 116 is calculated using the latest count 512. In yet another embodiment, counters 512 are controlled by a number of received data samples 328.

The sensor data quality evaluator 124 includes a data quality index calculator 520. The data quality index calculator 520 receives input from each counter 512, and produces a sensor data quality index 116 for the corresponding sensor 108. The operation of the data quality index calculator 520 is described in more detail with respect to FIG. 7.

Referring now to FIG. 6, a table illustrating Sensor Data Rules and Associations 412 in accordance with embodiments of the present invention is shown. Each sensor data quality evaluator 124 uses one or more rule detectors 508 to determine if specific data rules have been violated. Rules are generally selected from a group of predefined rules, although additional rules may be created in order to obtain an expanded pool of rules for future use.

FIG. 6 illustrates an exemplary embodiment of metadata 412 for N sensor data rules 604 as applied to N sensors 108, and one embodiment of how rules can be associated with each sensor 108. Sensor data 504 is received with a key:value specification based on Javascript Object Notation (JSON). An example JSON data structure is now presented for comparison for the of the rule violation cases. Properly structured sensor data 504 could be represented as:

```
{
    "hi": "there",
    "empty": "",
    "one": 1,
    "onetwothree": 1.23,
    "absence": "NULL"
}
```

Each of the rules is now further discussed. Rule 604A is "Sensor Data Repeats". This means data is incorrectly repeated when it is not expected. For example (repeating data underlined): 13.27, 17.32, 8.03, 12.24, 12.24, 12.24, 12.24, 9.76.

Rule 604B is "Sensor Data has 0.00 value". This means data is incorrectly received as zero or null data when zero is not expected. For example (zero data underlined): 13.27, 17.32, 8.03, 12.24, 0.000000, 0.000000, 12.24, 9.76.

Rule 604C is "Sensor Data is Shifted". This means received data columns are shifted and out of place and that key:value pairings have been offset. Therefore, a value that should apply to a first key is instead assigned to a second key, and the value for the second key is assigned to a different key, and so on. For example:

```
{
    "hi": "NULL",
    "empty": "there",
    "one": "",
    "onetwothree": 1,
    "absence": 1.23
}
```

Rule 604D is "Broken Sensor Data Structure". This means the format of an entire data set is different than expected or than received previously. For example:

```
{
    "hi": "there",
    "empty": "",
    "one": 1,
    ,
    ,
    "onetwothree": 1.23,
    "absence": "NULL"
}
```

Rule 604E is "Wrong Sensor Data Format". This means that categorical data (e.g. labels, categories, names, etc) are found where numerical data is expected. For example (wrong format data underlined): 13.27, 17.32, 8.03, 12.24, Moscow, 12.24, 12.24, 9.76.

Rule 604F is "Noisy Sensor Data". This means data where outliers that are statistically impossible are observed in an otherwise normal data set. For example (noisy data underlined): 13.27, 17.32, 8.03, 12.24, 12.24, 5400, 12.24, 9.76.

Rule 604G is "Logical Sensor Data Outliers". This means data that is statistically possible but impossible or nearly impossible logically. For example, for a corresponding sensor 108 that measures temperature, a Moscow city temperature of 65 degrees Celsius in January is mathematically possible, it is so unlikely that it represents some error other than actual data.

Rule 604H is "Merged or Split Sensor Data". This means data where some values are joined together or split apart in error. For example (joined data underlined): 13.27, a, 17.32, a, 8.03, a, 12.24a, 12.24, a, 12.24, a, 12.24, a, 9.76, a.

Rule 604I is "Null Data". This means data that is expected to be present that is instead missing. For example (null data underlined): 13.27, 17.32, 8.03, 12.24, Null, Null, Null, 9.76. For some sensors 108, "Null Data" may not be a valid rule violation since null data may be produced under normal operating conditions and is therefore not representative of a data quality problem.

Rule 604N is "Other sensor data rules". This means any other sensor data rules not already included in sensor data rules 604. It should be understood that the present invention is not limited to only the rules specifically described herein, but that any data rules that may be contemplated are reasonably included.

As shown in FIG. 6, Sensor 1 108A utilizes rules 604A and 604F, Sensor 2 108B utilizes rules 604B-604E, Sensor 3 108C utilizes rules 604A, 604C, 604H, and 604N, and Sensor N 108N utilizes rules 604D-604H. This configuration step is reflected in block 808 of FIG. 8.

Referring now to FIG. 7, a diagram illustrating Data Quality Index Calculation per sensor and per-device for time-based measurement in accordance with embodiments of the present invention is shown. Once a sampling interval has ended 316, either at the end of a fixed time window 312, rolling time window 320, or a predetermined number of samples 328, the sensor data quality evaluators 124, group data quality evaluators 208, and device data quality evaluator 140 calculate sensor data quality indices 116, group data quality indicies 212, and a device data quality index 136.

For each sensor 108, the following calculations are performed in parallel for all rules/detectors 508. First, a normalized fraction of rule violations for each rule 712 is calculated by dividing the number of received sensor data samples in the just-completed sampling interval that violate the rule 708 by the number of received sensor data samples in the sampling interval 704. For example, for one rule violation in three data samples in the sampling interval, the normalized fraction of rule violations for the corresponding rule would be ⅓ or 0.33. In other embodiments, the normalized fraction of rule violations for each rule 712 may take into account other sample intervals 316 in addition to the most recently completed sampling interval 316. In other embodiments, contributions from older sampling intervals 316 are weighted differently (most likely less) than the most recent sampling interval 316.

Second, rule violation contributions 720 are calculated for each rule/detector 508 by subtracting the normalized fraction of rule violations for each rule 712 from a value of 1. In the previous example, the rule violation contribution would therefore be (1−0.33)=0.67. In some embodiments, it may be understood that some rules/detectors 508 are more important than others, and various forms of weighting known in statistics and the art may be applied to one or more rule violation contributions 716. Weighting can be used to enhance or suppress individual rule violation contributions 716 relative to others. Although not specifically shown in FIG. 7 it should be understood the present invention includes any and all forms of applicable rules/detectors 508 weighting.

Third, the sensor data quality index 116 for a sensor is the product of each of the rule violation contributions 716 for each of the rules applying to the sensor 108. Thus:

$$DQI_{Sensor} = (1-X_1)*(1-X_2)*(1-X_3)* \ldots *(1-X_N)$$

In some embodiments not involving sensor groups 204 or where a device 104 has only a single sensor 108 and sensor output 120, the calculations described above would be sufficient, and either a human user or a software application may make decisions based on the Data Quality Index 116 (DQI) and history of DQI calculations. However, in embodiments where one or more groups 204 or a device data quality index 136 involving multiple sensors 108, a group 212 or device 136 Data Quality Index may be calculated:

$$DQI_{Group} = \text{Average of } DQI_{Sensor} \text{ in the group}$$

$$DQI_{Device} = \text{Average of } DQI_{Sensor} \text{ in the device or Average of } DQI_{Group} \text{ in the device}$$

In one embodiment, the average is simply the mean of $DQI_{Sensor}$ or $DQI_{Group}$. In other embodiments, the average may be other forms of averaging known in statistics in order to achieve different robustness expectations, including but not limited to harmonic mean or geometric mean. Additionally, weighting may also be used to enhance or suppress sensor or group DQIs relative to other sensor or group DQIs. Data quality indices 116, 212, 136 are initially assumed to be equal to 1, reflecting good data at the start. Data received from sensors 108 could be processed individually or in batches that are defined by sampling and transmission protocols.

Referring now to FIG. 8, a flowchart illustrating a configuration process in accordance with embodiments of the present invention is shown. The configuration process is generally run one time for each monitored IoT device 104. Flow begins at block 804.

At block 804, the sensors and sensor data characteristics for each device 104 are determined. Each sensor 108 produces sensor data 504, which has a normal operating range of data values 304. Sensor data characteristics are used to select which rules/detectors 508 to apply to a given sensor 108. Flow continues to block 808.

At block 808, rules and detectors 508 are determined for each sensor 108, based on the sensor data characteristics from block 804. At least one detector 508 must be configured for each sensor 108. Flow continues to block 812.

At block 812, sensor 124, group 208, and device 140 data quality evaluators are configured, depending on the desired range of results. In all cases, at least one sensor data quality evaluator 124 is configured for each sensor 108. Group 208 and device 140 evaluators may be optionally configured as well. Flow proceeds to block 816.

At block 816, the count control function 516 is configured for each sensor data quality evaluator 124, and time-based measurement 312, 320 or sample-based measurement 328 is selected. Flow ends at block 816.

Referring now to FIG. 9, a flowchart illustrating a sensor data quality evaluation process in accordance with embodiments of the present invention is shown. Flow begins at block 904.

At block 904, the IoT data quality evaluator 112 receives and stores sensor data 420 for all sensors 108 and sensor outputs 120 of IoT device 104. Flow proceeds to block 908.

At block 908, the IoT data quality evaluator 112 routes sensor data 504 to assigned rule detectors 508 for all sensors 108. Rule detectors 508 were previously assigned during the configuration process, in block 808. Flow proceeds to block 912.

At block 912, the rule detectors 508 count instances of rule violations for the most recent sampling interval 316. In some embodiments, the counted instances are stored for use in calculating data quality indices 116, 136, 212. Flow proceeds to decision block 916.

At decision block 916, the sensor data quality evaluator 124, group data quality evaluator 208, and device data quality evaluator 140 determine if the current sampling interval 316 has ended. If the current sampling interval 316 has not ended, then flow proceeds to block 904. If the current sampling interval 316 has ended, then flow instead proceeds to block 920.

At block 920, the sampling interval 316 has ended and the sensor data quality evaluator 124, group data quality evaluator 208, and device data quality evaluator 140 calculate sensor 116, group 212, and device 136 data quality indices. This block is described in more detail in FIG. 10. Flow ends at block 920.

Referring now to FIG. 10, a flowchart illustrating a calculate data quality index process in accordance with embodiments of the present invention is shown. Steps 1004 through 1028 are performed in parallel by all sensor data quality evaluators 124 for all sensors 108. Flow begins at block 1004.

At block 1004, an initial rule detector 508 is selected to evaluate. In all cases, there is at least one rule detector 508 to evaluate. Flow proceeds to block 1008.

At block 1008, the sensor data quality evaluator 124 retrieves a number of received data values 704 and number of rule violations 708 for the just-completed sampling interval 316. The data values 704 may be retrieved from sensor data 420 and number of rule violations 708 may be retrieved from a rule violation counter 512 corresponding to the current rule detector 508. Flow proceeds to block 1012.

At block 1012, the sensor data quality evaluator 124 calculates a normalized fraction of rule violations 712 by dividing the number of rule violations 708 for the current rule detector by the number of received data values 704 for the just-completed sampling interval 316. Flow proceeds to block 1016.

At block 1016, the sensor data quality evaluator 124 calculates a rule violation contribution 716 by subtracting the normalized fraction of rule violations 712 from a value of 1. Flow proceeds to decision block 1020.

At decision block 1020, the sensor data quality evaluator 124 determines if there are more rule detectors 508 to evaluate, for the sensor 108. If there are more rule detectors 508 to evaluate, then flow proceeds to block 1024. If there are not more rule detectors 508 to evaluate, then flow instead proceeds to block 1028 to calculate the sensor data quality index 116.

At block 1024, the sensor data quality evaluator 124 selects a next rule detector 508. Flow proceeds to block 1008 to calculate a rule violation contribution 716 for the next rule detector 508.

At block 1028, the sensor data quality evaluator 124 calculates the sensor data quality index 116 for the current sensor by multiplying all rule violation contributions 716 together for all rule detectors 508. Flow ends at block 1028 if only sensor data quality indices 116 are being calculated, but flow proceeds to optional block 1032 to calculate a device data quality index 136 and/or to optional block 1036 to calculate a group data quality index 212. In one embodiment, the IoT data quality evaluator 112 generates an informational alert to a user or computer indicating the calculated sensor data quality index 116. In another embodiment, the IoT data quality evaluator 112 generates an actionable alert to a user or computer indicating the calculated sensor data quality index 116. Actionable alerts involve taking some action based on the notification.

At optional block 1032, a device sensor data quality evaluator 140 determines a device data quality index 136 by averaging all sensor data quality indicies 116 that are applicable to the device 104. Alternatively, a device sensor data quality evaluator 140 determines a device data quality index 136 by averaging all group data quality indicies 212 that are applicable to the device 104. Averaging may be any of the forms previously discussed, including a mean or a weighted average. Flow ends at block 1032. In one embodiment, the IoT data quality evaluator 112 generates an informational alert to a user or computer indicating the calculated device data quality index 136. In another embodiment, the IoT data quality evaluator 112 generates an actionable alert to a user or computer indicating the calculated device data quality index 136. Actionable alerts involve taking some action based on the notification.

At optional block 1036, a group sensor data quality evaluator 208 determines a group data quality index 212 by averaging all sensor data quality indicies 116 that are part of the group 204. Averaging may be any of the forms previously discussed, including a mean or a weighted average. Flow ends at block 1036. In one embodiment, the IoT data quality evaluator 112 generates an informational alert to a user or computer indicating the calculated group data quality index 212. In another embodiment, the IoT data quality evaluator 112 generates an actionable alert to a user or computer indicating the calculated group data quality index 212. Actionable alerts involve taking some action based on the notification.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel embodiment.

The descriptions and figures included herein depict specific embodiments to teach those skilled in the art how to make and use the best option. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method comprising:
for a device comprising at least one sensor providing sensor data:
initializing, for at least one rule detector, a count of zero at a beginning of a sampling interval;
receiving, by a computer coupled to the device, the sensor data during the sampling interval;
providing the sensor data to the at least one rule detector;
evaluating, by the at least one rule detector, instances of sensor data triggered by the at least one rule detector;
determining, by the computer, that the sampling interval has ended, and in response:
calculating a data quality index based on the instances of triggered sensor data during the sampling interval.

2. The method of claim 1, wherein in response to receiving the sensor data, the method further comprising:
storing sensor data for at least the sampling interval.

3. The method of claim 1, wherein evaluating, by the at least one rule detector, instances of sensor data triggered by the at least one rule detector comprising:
maintaining a count, for each rule detector, of a number of rule violations during the sampling interval, wherein the sampling interval is one of a most recent of a series of fixed time intervals or a rolling window of fixed time duration.

4. The method of claim 3, wherein the at least one sensor comprises a plurality of sensors, wherein different sensors of the plurality of sensors each utilize a different combination of rule detectors.

5. The method of claim 3, wherein the at least one rule detector evaluates sensor data for at least one of: repeating data, zero value data, shifted data, a broken sensor data structure, an incorrect sensor data format, noisy data, logical sensor data outliers, null data, and split sensor data.

6. The method of claim 3, wherein determining that a sampling interval has ended comprising one of:
the most recent of the series of fixed time intervals has elapsed;

at least a predetermined number of sensor data values has been received in the rolling window of fixed time duration; and the predetermined number of sensor data values has been received since a previous sampling interval has ended.

7. The method of claim 1, wherein calculating the data quality index comprising:

for each of the at least one sensor:
for each of the at least one rule detector:
calculating a normalized fraction of rule violations during the sampling interval; and
subtracting each of the normalized fraction of rule violations from a value of one to obtain rule violation contributions; and
multiplying each of the rule violation contributions together in order to obtain a sensor data quality index.

8. The method of claim 7, wherein the normalized fraction of rule violations comprises a number of received sensor data in the sampling interval that violate a rule corresponding to one of the at least one rule detectors divided by a number of received sensor data during the sampling interval.

9. The method of claim 7, wherein the computer calculates a device data quality index by averaging the sensor data quality indices for the at least one sensor, wherein the device data quality index is the sensor data quality index when the device has only one sensor.

10. A non-transitory computer readable storage medium configured to store instructions that when executed cause a processor to perform:

for a device comprising at least one sensor providing sensor data:
initializing, for at least one rule detector, a count of zero at a beginning of a sampling interval;
receiving, by a computer coupled to the device, the sensor data during the sampling interval;
providing the sensor data to the at least one rule detector;
evaluating, by the at least one rule detector, instances of sensor data triggered by the at least one rule detector;
determining, by the computer, that the sampling interval has ended, and in response:
calculating a data quality index based on the instances of triggered sensor data during the sampling interval.

11. The non-transitory computer readable storage medium of claim 10, wherein evaluating, by the at least one rule detector, instances of sensor data triggered by the at least one rule detector comprising:

maintaining a count, for each rule detector, of a number of rule violations during the sampling interval, wherein the sampling interval is one of a most recent of a series of fixed time intervals or a rolling window of fixed time duration.

12. The non-transitory computer readable storage medium of claim 11, wherein prior to receiving sensor data, the method further comprising:

determining sensors and sensor data characteristics for the device;
configuring rules and rule detectors for the at least one sensor;
configuring sensor, group, and device data quality indices; and
configuring counts for evaluating instances of sensor data triggered by the at least one rule detector.

13. The non-transitory computer readable storage medium of claim 11, wherein calculating the data quality index comprising:

for each of the at least one sensor:
for each of the at least one rule detector:
calculating a normalized fraction of rule violations during the sampling interval; and
subtracting each of the normalized fraction of rule violations from a value of one to obtain rule violation contributions; and
multiplying each of the rule violation contributions together in order to obtain a sensor data quality index.

14. The non-transitory computer readable storage medium of claim 13, wherein the normalized fraction of rule violations comprises a number of received sensor data in the sampling interval that violate a rule corresponding to one of the at least one rule detectors divided by a number of received sensor data during the sampling interval.

15. The non-transitory computer readable storage medium of claim 13, the device comprising a plurality of sensors in a group, wherein the computer calculates a group data quality index by averaging the sensor data quality indices for the plurality of sensors in the group.

16. A system, comprising:

a device, comprising:
at least one sensor configured to provide sensor data; and
a server, coupled to the device, configured to:
initialize, for at least one rule detector, a count of zero at a beginning of a sampling interval;
receive and store the sensor data during the sampling interval;
provide the sensor data to the at least one rule detector;
evaluate, by the at least one rule detector, instances of sensor data triggered by the at least one rule detector;
determine that the sampling interval has ended, and in response:
calculate a data quality index based on the instances of triggered sensor data during the sampling interval.

17. The system of claim 16, wherein the at least one rule detector evaluates sensor data for at least one of: repeating data, zero value data, shifted data, a broken sensor data structure, an incorrect sensor data format, noisy data, logical sensor data outliers, null data, and split sensor data.

18. The system of claim 16, wherein calculating the data quality index comprising:

for each of the at least one sensor:
for each of the at least one rule detector:
calculating, by the server, a normalized fraction of rule violations during the sampling interval; and
subtracting each of the normalized fraction of rule violations from a value of one to obtain rule violation contributions; and
multiplying each of the rule violation contributions together in order to obtain a sensor data quality index.

19. The system of claim 18, wherein the normalized fraction of rule violations comprises a number of received sensor data in the sampling interval that violate a rule corresponding to one of the at least one rule detectors divided by a number of received sensor data during the sampling interval.

20. The system of claim 18, wherein the server calculates a device data quality index by averaging the sensor data quality indices for the at least one sensor.

* * * * *